United States Patent
Liu

(10) Patent No.: US 6,301,045 B1
(45) Date of Patent: Oct. 9, 2001

(54) THREE-PORT OPTICAL CIRCULATOR

(75) Inventor: Yugiao Liu, Sunnyvale, CA (US)

(73) Assignee: Alliance Fiber Optics Products, Inc., Sunnyvale, CA (US)

( * ) Notice: Subject to any disclaimer, the term of this patent is extended or adjusted under 35 U.S.C. 154(b) by 0 days.

(21) Appl. No.: 09/239,031

(22) Filed: Jan. 27, 1999

(51) Int. Cl.[7] .................................................. G02B 5/30
(52) U.S. Cl. ........................ 359/484; 359/494; 359/495; 359/496; 359/497; 359/900; 385/11
(58) Field of Search ................................. 359/484, 494, 359/495, 496, 497, 900; 385/11

(56) References Cited

U.S. PATENT DOCUMENTS

| | | | | |
|---|---|---|---|---|
| 3,442,571 | * | 5/1969 | Itzkan | 359/833 |
| 4,464,022 | * | 8/1984 | Emkey | 359/484 |
| 4,556,292 | * | 12/1985 | Mathyssek et al. | 359/833 |
| 5,471,340 | * | 11/1995 | Cheng et al. | 359/484 |
| 5,581,640 | * | 12/1996 | Pan et al. | 359/497 |
| 5,734,763 | * | 3/1998 | Chang | 385/11 |
| 5,909,310 | * | 6/1999 | Li et al. | 359/484 |
| 5,973,832 | * | 10/1999 | Bettman | 359/497 |
| 5,982,539 | * | 11/1999 | Shirasaki | 359/497 |
| 5,991,076 | * | 11/1999 | Cheng | 359/495 |
| 6,011,649 | * | 1/2000 | Chang | 359/497 |
| 6,026,202 | * | 2/2000 | Chang | 359/497 |
| 6,049,426 | * | 4/2000 | Xie et al. | 359/497 |
| 6,088,491 | * | 7/2000 | Sorin et al. | 359/483 |
| 6,111,695 | * | 8/2000 | Lee et al. | 359/497 |

FOREIGN PATENT DOCUMENTS

| | | | | |
|---|---|---|---|---|
| 2038022 | * | 7/1980 | (GB) | 359/495 |
| 0102621 | * | 5/1986 | (JP) | 359/484 |
| 0200319 | * | 9/1987 | (JP) | 359/495 |
| 404310915A | * | 11/1992 | (JP) | 359/495 |
| 406242401A | * | 9/1994 | (JP) | 359/496 |

* cited by examiner

*Primary Examiner*—Cassandra Spyrou
*Assistant Examiner*—John Juba, Jr.
(74) *Attorney, Agent, or Firm*—Wei Te Chung

(57) ABSTRACT

A circulator (10) includes a first collimating device (12) and a second collimating device (16) with three external optic fibers (14), (18) & (20) thereon wherein the first fiber (18) and the third fiber (20) are coupled to the second collimating device (16) while the second fiber (14) is coupled to the first collimating device (12). A non-reciprocal section (22) is positioned between the first collimating device (12) and the second collimating device (16). The non-reciprocal section (22) includes a first optic isolator section (24) and a second optic isolator section (26) commonly sandwiching a first light deflecting device (28) therebetween, and a second light deflecting device (30) being positioned between the second optic isolator section (26) and the second collimating device (16).

25 Claims, 5 Drawing Sheets

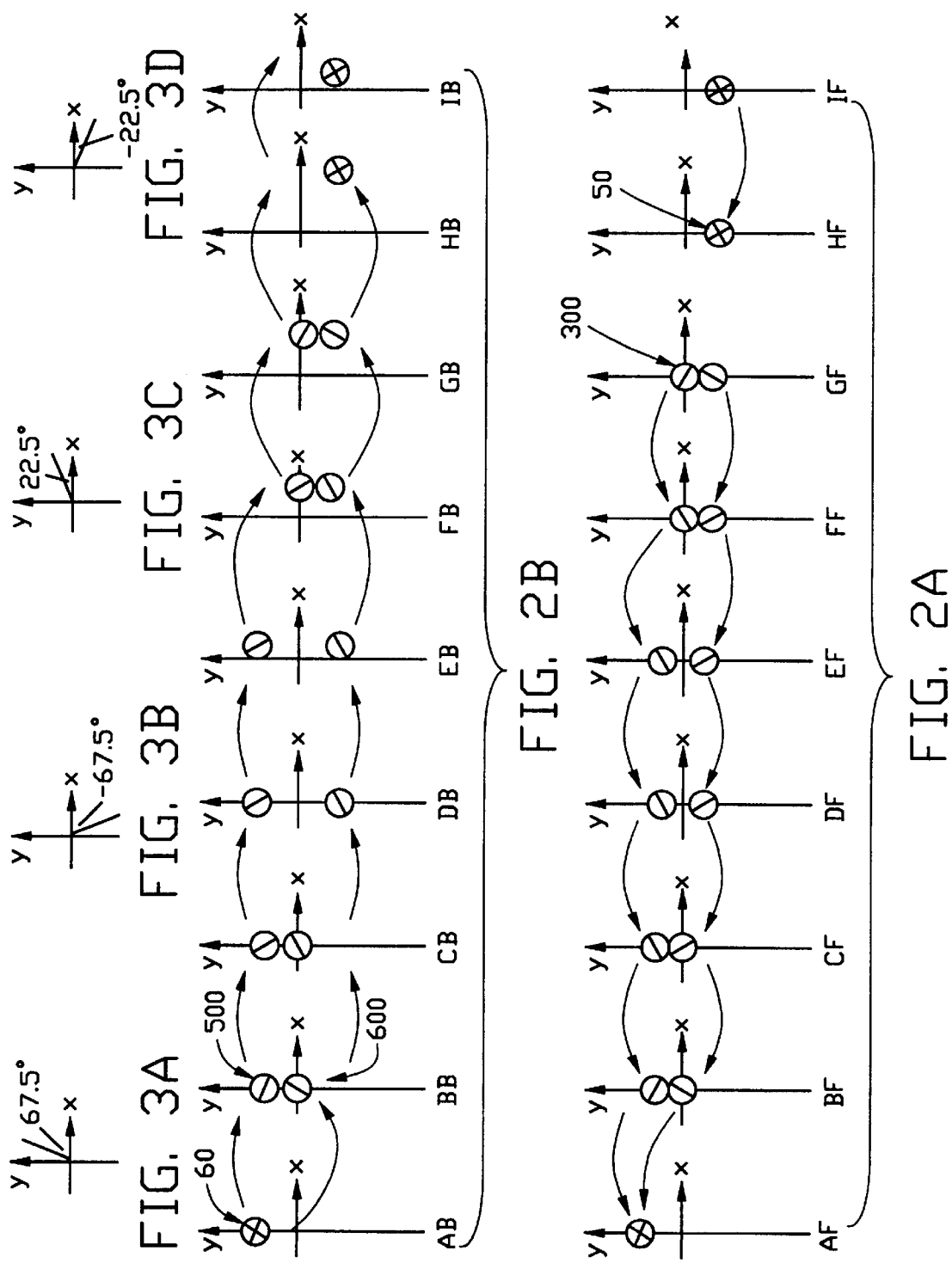

THREE-PORT OPTICAL CIRCULATOR

BACKGROUND OF THE INVENTION

1. Field of The Invention

The invention relates to circulators, and particularly to the fiber optic circulator with simple structures thereof.

2. The Related Art

An fiber optic circulator is designed to provide a non-reciprocal multi-port optical device which allows the forward light beam and the backward light beam to travel therethrough in different paths. Therefore, in a three ports fiber optic circulator the light beam coupled into the first port will propagate out from the second port and the light beam coupled into the second port will propagate out from the third port. Anyhow, the traditional circulator has complicated structures and parts. The theory and application of the circulator can be referred to the publication of "Optical Waves in Crystals" having the authors of Amnon Yariv and Pochi Yeh, and U.S. Pat. Nos. 5,574,596, 5,581,640, 5,631,771, 5,661,829, 5,689,593 and 5,734,762.

Therefore, an object of the invention is to provide an inexpensive device with simplified structures thereof for achieving the same function.

SUMMARY OF THE INVENTION

According to an aspect of the invention, a circulator includes first and second collimating devices with three external optic fibers theron wherein the first optic fiber and the third optic fiber are coupled to the second collimating device while the second external optic fiber is coupled to the first collimating device. The non-reciprocal section includes a first optic isolator section and a second optic isolator section commonly sandwiching a first light deflecting device therebetween, and a second light deflecting device being positioned between the second optic isolator section and the second collimating device. Therefore, a first light beam through the first optic fiber entering the second collimating device, may exit through the first collimating device by the second optic fiber, while a second light beam through the second optic fiber entering the first collimating device, may exit through the second collimating device by the third fiber, wherein the first light beam and the second light beam propagate opposite to each other.

BRIEF DESCRIPTION OF THE DRAWINGS

FIG. 2(A) shows the DOPs of two split forward rays of the forward light beam of FIG. 1 at the different stages/positions along axis Z, for example, stage AF representing the forward ray at position A, wherein coordinate X and Y are provided for illustrating the positions of the rays on the X-Y plane.

FIG. 2(B) shows the DOPs of two split backward rays of the backward light beam of FIG. 1 at different stages/positions along axis Z, for example, stage AB representing the backward ray at position A, wherein coordinate X and Y are provided for illustrating the positions of the rays on the X-Y plane.

FIG. 3(A) shows the angle of the optic axis of the first birefringent wedge of FIGS. 1(A)–1(C).

FIG. 3(B) shows the angle of the optic axis of the second birefringent wedge of FIGS. 1(A)–1(C).

FIG. 3(C) shows the angle of the optic axis of the third birefringent wedge of FIGS. 1(A)–1(C).

FIG. 3(D) shows the angle of the optic axis of the fourth birefringent wedge of FIGS. 1(A)–1(C).

DETAILED DESCRIPTION OF PREFERRED EMBODIMENTS

References will now be in detail to the preferred embodiments of the invention. While the present invention has been described in with reference to the specific embodiments, the description is illustrative of the invention and is not to be construed as limiting the invention various modifications to the present invention can be made to the preferred embodiments by those skilled in the art without departing from the true spirit and scope of the invention as defined by appended claims.

Figure 1A:
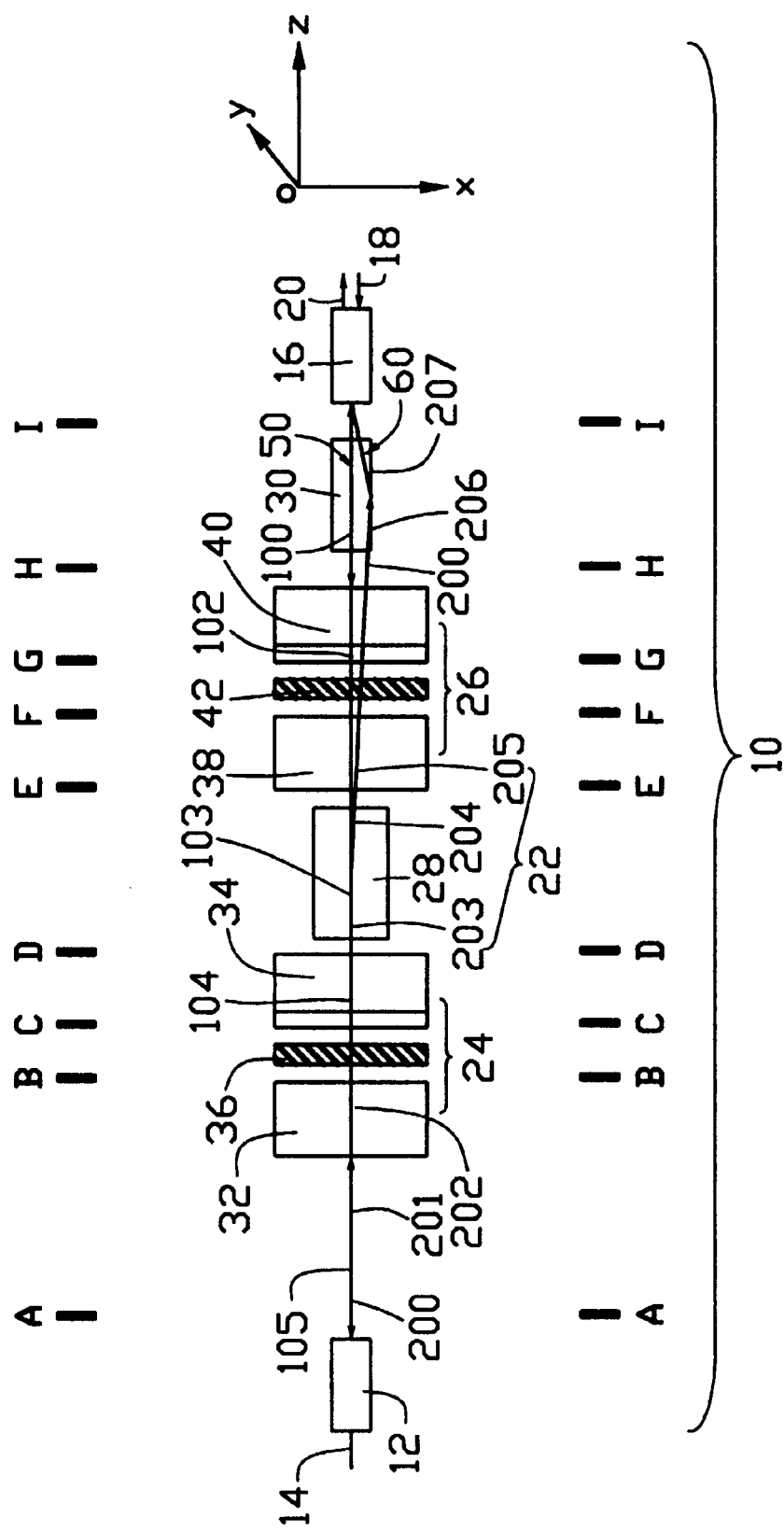
FIG. 1(A) is a top view of a presently preferred embodiment of a circulator, according to the invention, wherein the coordinate axes and axial positions A-I along axis Z are provided therewith for illustration.
Figure 1B:
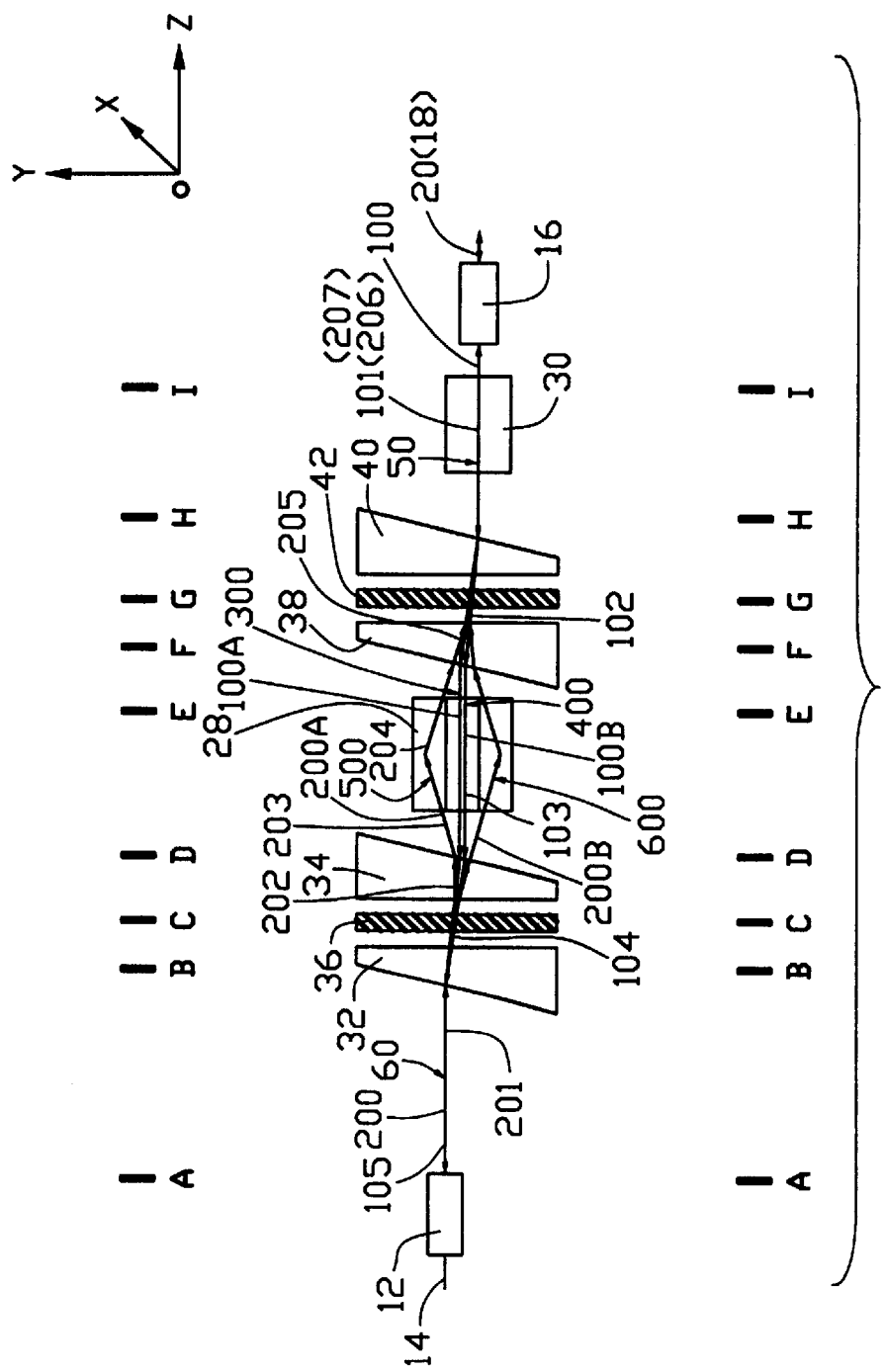
FIG. 1(B) is a side view of the circulator of FIG. 1(A), wherein the coordinate axes and axial positions A-I along axis Z are provided for illustration.
Figure 1C:
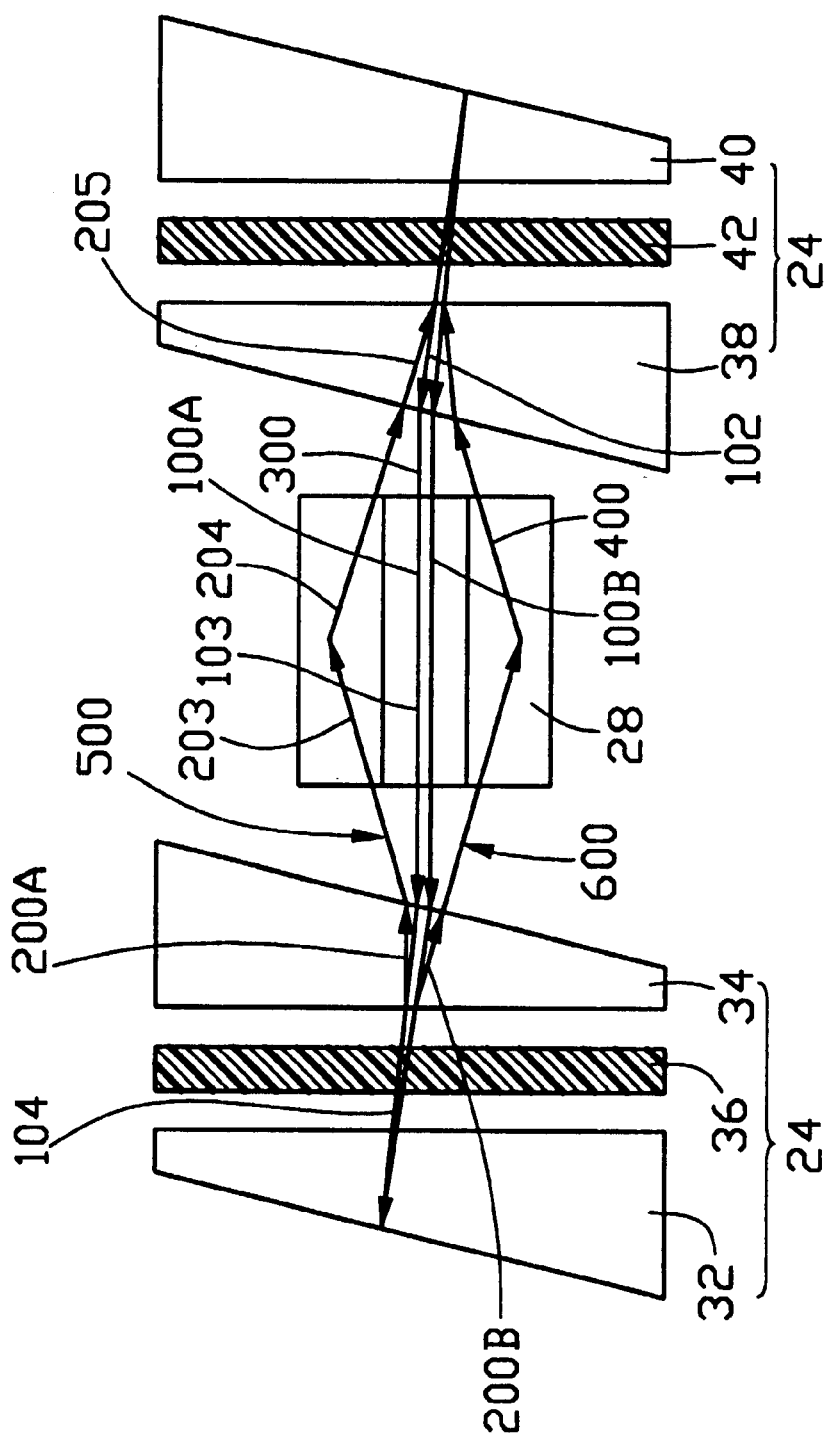
FIG. 1(C) is an enlarged top view of the non-reciprocal section of FIG. 1 to illustrate the different paths of the forward and backward light beams.

It will be noted here that for a better understanding, most of like components are designated by like reference numerals throughout the various figures in the embodiments. Attention is directed to FIGS. 1(A)–1(C) wherein a fiber optic circulator 10 includes first and second collimating devices 12, 16 with three external optic fibers thereon, wherein the first external optic fiber 18 and the third external optic fiber 20 are coupled to the second collimating device 16 while the second external optic fiber 14 is coupled to the first collimating device 12. A non-reciprocal section 22 is positioned between the first collimating device 12 and the second collimating device 16.

The non-reciprocal section 22 includes a first isolator section 24 and a second isolator section 26 commonly sandwiching a first light deflecting device 28 therebetween, and a second light deflecting device 30 being positioned between the second isolator section 26 and the second collimating device 16.

The first isolator section 24 includes a first birefringent wedge 32, a second birefringent wedge 34 that is exactly same as the first birefringent wedge 32 but conversely positioned regard to the first birefringent wedge 32, and a first Faraday rotator 36 positioned therebetween. Similarly, the second isolator section 26 includes a third birefringent wedge 38, a fourth birefringent wedge 40 that is exactly same as the third birefringent wedge 38 but conversely positioned with regard to the third birefringent wedge 38, and a second Faraday rotator 42 therebetween.

Therefore, when a forward light beam 50 enters the second collimating device 16 from the first optic fiber 18, it goes through a main forward path 100, including:

(1) the first forward section 101 in the second light deflecting device 30, without deflection on both X and Y axes;

(2) the second forward section 102 in the second isolator section 26, whereby it starts to split into two closely juxtaposed first and second forward paths 100A and

100B without deflection on axis X while with plus deflection on axis Y;

(3) the third forward section 103 in the first light deflecting device 28, without deflection on both X and Y axes wherein the first forward path 100A and the second forward path 100B extend parallel with each other and along the axial direction of the circulator 10;

(4) the fourth forward section 104 in the first isolator section 24, without deflection on axis X while with plus deflection on axis Y, wherein the first forward path 100A and the second forward path 100B are eventually rejoined with each other; and (5) the fifth forward section 105, thus reaching the first collimating device 12.

Differently, when a backward light beam 60 entering the first collimating device 12 from the second optic fiber 14, it goes through a main backward path 200, including:

(1) a first backward section 201, which shares the same path with the fifth forward section 105, without deflection on both X and Y axes;

(2) a second backward section 202 in the first isolator section 24, whereby it starts to split into two first and second backward paths 200A and 200B, and the path 200A is directed without deflection on axis X while with first minus and second plus deflection on axis Y, and the path 200B is directed without deflection on axis X while with minus deflection on axis Y;

(3) a third backward section 203 in the first half of the first deflecting device 28, thereby the path 200A being without deflection on axis X while with plus deflection on axis Y, and the path 200B being without deflection on axis X while with minus deflection on axis Y;

(4) a fourth backward section 204 in the second half of the first deflecting device 28, thereby the path 200A being with plus deflection on axis X and minus deflection on axis Y, and the path 200B being with plus deflection on both X and Y axes;

(5) a fifth backward section 205 in the second isolator section 26, thereby the path 200A being with plus deflection on axis X and minus deflection on axis Y, and the path 200B being with plus deflection on axis X while with first plus and second minus deflection on axis Y;

(6) a sixth backward section 206 in the first half of the second deflecting device 30, wherein the paths 200A and 200B have been converged to be one with plus deflection on axis X while without deflection on axis Y; and (7) a seventh backward section 207 in the second half of the second deflecting device 30, with minus deflection on axis X while without deflection on axis Y, thus reaching the second collimating device 30 and exit through a third optic fiber 20.

The above disclosure generally describes the different paths of the forward and backward light beam 60. The reason why the forward and backward light beam 60 use the different paths, is illustrated below.

It should be understood that such four birefringent wedges 32, 34, 38 and 40 as positioned in FIGS. 1(A)–1(C), designedly respectively have their own inherent optic axis thereof wherein referring to FIGS. 3(A)–3(D), the first birefringent wedge 32 is characterized with 67.5° optic axis with regard to axis X, the second birefringent wedge 34 with −67.5° optic axis with regard to axis X, the third birefringent wedge 38 with 22.5° optic axis with regard to axis X, and the fourth birefringent wedge 40 with −22.5° optic axis with regard to axis X. Simultaneously, the first Faraday rotator 36 and the second Faraday rotator 42 may rotate the direction of the light beam polarization with −45° and 45°, respectively. Correspondingly, the light beam propagating through a birefringent wedge, can be characterized by its DOP (Direction of Polarization) with regard to the optic axis of the birefringent wedge, whereby a light beam is called as an E-ray (i.e., extraordinary one) which has polarization substantially aligned with the optic axis of the birefringent wedge the light beam passes through; oppositely, a light beam is called as an O-ray (i.e., ordinary one) which has polarization perpendicular to the optic axis of the birefringent wedge the light beam passes through.

One important and basic phenomena is noted herewith that the light beam may have a relatively large branching (splitting) angle between the O-ray and E-ray if an O-ray (E-ray) to a first birefringent wedge is substantially an E-ray(O-ray) to a second birefringent wedge as arranged in FIGS. 1(A) and 1(B) when the light beam propagates from the first birefringent wedge to the second birefringent wedge. Oppositely, if an O-ray(E-ray) to the first birefringent wedge is still an O-ray(E-ray) to the second birefringent wedge as arranged in FIG. 1, only minor negligible deflection occurs therebetween. As mentioned earlier, the invention achieves the circulator's functions by using the same internal parts to have the forward and backward light beam 60 pass through the different paths therein. This effect is implemented by means that the forward light beam travels through the parts by less deflection while the backward light beam 60 travels through the parts with greater deflection due to this phenomena as being a result of sandwiching the non-reciprocal Faraday rotator between the birefringent wedges, thus assuring traveling of the opposite light beams along the different paths.

Under this situation, referring to FIG. 2(A), the forward light beam 50 at IF and HF stages may be regarded as a combination of an E-ray and an O-ray thereof. After passing the fourth birefringent wedge 40 having an optic axis along −22.5° axis, the forward light beams 50 may slightly diverge into two closely branched upper ray 300 along the path 100A and lower ray 400 along the path 100B (stage GF) wherein the upper ray 300 can be characterized as an E-ray with DOP of −22.5°, and the lower ray 400 as an O-ray with DOP of 67.5°. After passing the second Faraday rotator 42, these two E-ray (upper ray 300) and O-ray (lower ray 400) are further deflected slightly away from each other on axis Y while the polarization of the E-ray (upper ray 300) and the O-ray (lower ray 400) are rotated with 45° by means of the second Faraday rotator 42, and have DOPs of 22.5° and 112.5°, respectively, as shown in stage FF. After passing the third birefringent wedge 38, these two E-ray (upper ray 300) and O-ray (lower ray 400) further only little bit moved away from each other on axis Y (stage EF) without any significant branching phenomena occurring thereof. It is because the rotated E-ray (upper ray 300) with DOP of 22.5° and O-ray (lower ray 400) with DOP of 112.5° are exact to respectively be still the E-ray and the O-ray of the third birefringent wedge 38 which defines an optic axis along the 22.5° direction.

The forward light beam 50 generally changes nothing when passing the first deflecting device 28 (stage DF). When successively passing the second birefringent wedge 34, the E-ray (upper ray 300) with DOP of 22.5° at stage DF is the substantially O-ray with regard to the second birefringent wedge 34 having DOP of −67.5° thereof and the O-ray (lower ray 400) with DOP of −67.5° at stage DF is certainly the E-ray to the second birefringent wedge 34. Through this mutual conversion between O-ray and E-ray, the two parallel rays may differently but convergently deflected toward each other (stage CF).

The forward light beam 50 further passes the first Faraday rotator 36 wherein the O-ray (upper ray 300) and the E-ray (the lower ray 400) are further deflected slightly toward each other on axis Y while the polarization of the O-ray (upper ray 300) and the E-ray (lower ray 400) are rotated with −45° by means of the first Faraday rotator 36, and have DOPs of −22.5° and 67.5°, respectively, as shown in stage BF.

The forward light beam 50 further passes the first birefringent wedge 24, and the O-ray (upper ray 300) and the E-ray (lower ray 400) further only little bit moved toward each other on axis Y until they rejoin each other and leave the first birefringent wedge 24. It is because the rotated O-ray (upper ray 300) with DOP of −22.5° and E-ray (lower ray 400) with DOP of 67.5° are exact to respectively still be the O-ray and the E-ray of the first birefringent wedge 24 which defines an optic axis along the 67.5° direction.

The forward light beam may eventually be substantially the same as the original one after leaving the first birefringent wedge 32 of the first isolator section 24 (stage AF).

The above disclosure illustrates the characters of the forward light beam 50 when the forward light beam 50 passes the circulator 10.

Differently, referring to FIG. 2(B), the backward light beam 60 at stage AB can be treated as a combination of an E-ray and an O-ray thereof. After passing the first birefringent wedge 32 having optic axis along the 67.5° direction, the backward light beam 60 may slightly diverge into two slightly branched upper ray 500 along the path 200A and lower ray 600 along the path 200B (stage AB to BB) wherein the upper ray 500 can be characterized as an O-ray with DOP of −22.5° and the lower ray 600 as an E-ray with DOP of 67.5° with regard to axis X.

The backward light beam 60 successively passes the first Faraday rotator 36 whereby the O-ray (upper ray 500) and the E-ray (lower ray 600) are further deflected slightly away from each other on axis Y while the polarization of the O-ray (upper ray 500) and the E-ray (lower ray 600) are rotated with −45° by means of the first Faraday rotator 36, and have DOPs of −67.5° and 22.5°, respectively, as shown in stage CB.

When the back light beam 60 successively passes the second birefringent wedge 34, the O-ray (upper ray 500) and the E-ray (lower ray 600) are significantly deflected away from each other wherein the upper ray 500 has a relatively large plus deflection on axis Y and the lower ray 600 has a relatively large minus deflection on axis Y. It is because the rotated O-ray (upper ray 500) with DOP of −67.5° and E-ray (lower ray 600) with DOP of 22.5° are exact to respectively be the opposite E-ray and O-ray of the second birefringent wedge 34 which defines an optic axis along the −67.5° direction, and the mutual conversion between the O-ray and the E-ray results in the relative significant beam branching thereof as mentioned before, as shown at stage DB.

Then, after passing the first isolator section 24, the backward light beam 60 further passes the first deflecting device 28 wherein the outward E-ray (upper ray 500) is converted to be the inward E-ray due to its total reflection at the slanting side surfaces of the first deflecting device 28; similarly, the outward O-ray (lower ray 600) is converted to be the inward O-ray for the same reason. In other words, through the first deflecting device 28, the divergent rays 500, 600 become the convergent rays, as shown at stage EB.

Once such convergent rays 500, 600 enter the third birefringent wedge 38, the E-ray (upper ray 500) with DOP of −67.5° is substantially the O-ray with regard to the third birefringent wedge 38 having an optic axis in the 22.5° direction, and the O-ray (lower ray 600) with DOP of 22.5° is substantially the E-ray thereto. As a result, these two rays 500, 600 are convergently deflected significantly toward each other, as shown in stage FB.

After passing the third birefringent wedge 38, the significantly converged O-ray (upper ray 500) with DOP of −67.5° and E-ray (lower ray 600) with DOP of 22.5° thereof enter the second Faraday rotator 42 and respectively rotates with 45° to have DOPs of −22.5° and 67.5° as shown at stage GB.

The rotated O-ray (upper ray 500) with DOP of −22.5° and E-ray (lower ray 600) with DOP of 67.5°, successively enter the fourth birefringent wedge 40 and further significantly convergently deflected toward each other until they rejoin each other and leave the fourth birefringent wedge 40, as shown at stage HB. It is because the O-ray (upper ray 500) with DOP of −22.5° and E-ray (lower ray 600) with DOP of 67.5° are exact to respectively be the opposite E-ray and O-ray of the fourth birefringent wedge 40 which defines an optic axis along the −22.5° direction, and the mutual conversion between the O-ray and the E-ray results in relative significant deflection thereof as mentioned before.

The rejoined backward light beam 60 then successively passes the second deflecting device 30 with total reflection at the bottom surface 302 (FIG. 5) thereof and enters the second collimator 16.

The above description illustrates the characters of the backward light beam 60 when the backward light beam 60 passes the circulator 10.

Figure 5:
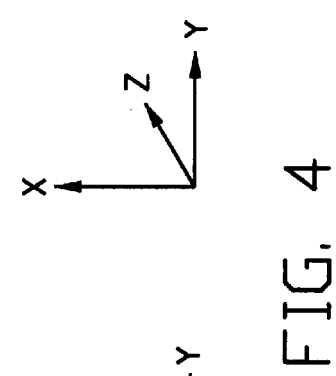
FIG. 5 shows the second deflecting device of FIGS. 1(A) and 1(B).
Figure 4:
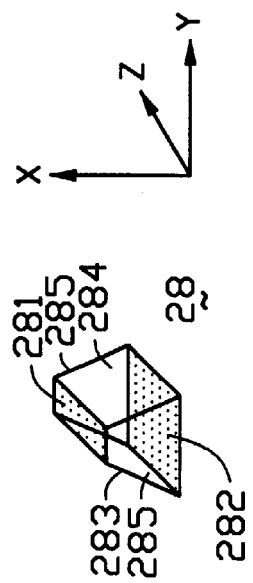
FIG. 4 shows the first deflecting device of FIGS. 1(A) and 1(B)

It should be noted that referring to FIG. 5, the first deflecting device 28 is generally a dovetail prism which includes a bottom surface 282, two symmetric polished slanting upper and lower side surfaces 283, 284, two opposite polished end surfaces 285 each coated with an anti-reflection coating, and an optional top surface 281. Therefore, when the outward deflected upper ray 500 of the backward light beam 60 hits the upper side surface 283, the totally reflected upper ray 500 moves with minus deflection on axis Y and plus deflection on axis X. In opposite, the totally reflected lower ray 600 hitting the lower side surface 282, moves with plus deflection on both X and Y axes. Additionally, referring to FIG. 4, the second deflecting device 30 is a rectangular prism including a top surface 301, bottom surface 302, two side surfaces 303 and a pair of polished opposite end surfaces 304 each coated with anti-reflection coating. Thus, the rejoined backward light beam 60 leaving the second isolator section 26 with plus deflection on axis X, may hit the polished bottom surface 302 of the second deflecting device 30 and be reflected with minus deflection on axis X. Understandably, with assistance of the first and second deflecting devices 28 and 30, the forward light beam 50 and the backward light beam 60 regardless of whether each in a splitting or combining condition, may travel through the circulator 10 in different paths.

Figure 6:
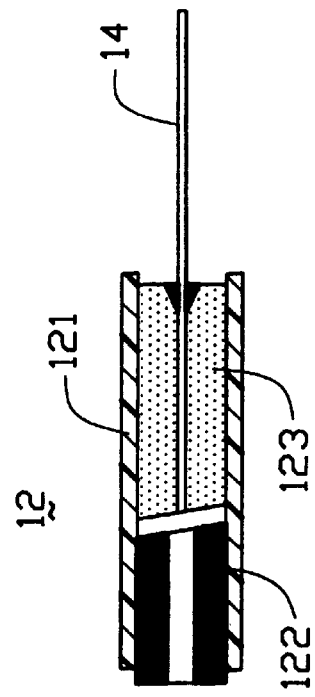
FIG. 6 shows the first collimator of FIGS. 1(A) and 1(B).

FIG. 6 shows the first collimator 12 includes a first sleeve 121 enclosing a first gradient index rod lens 122 and a single fiber optic ferrule 123 through which the second optic fiber 14 extends, wherein the forward light beam 50 enters the first collimator 12 through the fifth forward section 105, the first gradient index rod lens 122, and leaves therefrom through the first fiber 14.

Figure 7:
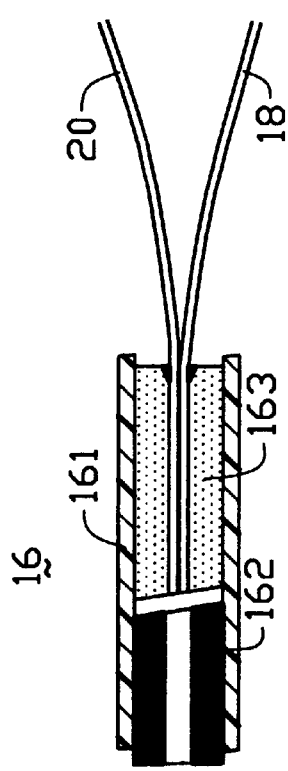
FIG. 7, shows the second collimator of FIGS. 1(A) and 1(B).

Similarly, FIG. 7 shows the second collimator 16 includes a second sleeve 161 enclosing a second gradient index rod lens 162 and a dual fiber optic ferrule 163 through which the second and third optic fibers 18, 20 extend, wherein the forward light beam 50 enters the second collimator 30 through the first optic fiber 18, the second gradient index rod lens 163, and moves toward the first forward section 102 of the forward path 100; in opposite, the backward light beam 60 enters the second collimator 30 from the seventh backward section 207 of the backward path 200, through the dual fiber ferrule 163, and leaves through the third optic fiber 20.

Therefore, to the subject circulator 10, the forward light beam may enter from the first port, i.e., the first optic fiber 18 of the second collimator 16 through the forward path 100 and leave from the second optic fiber 14 of the first collimator 12. In contrast, the backward light beam may enter from the second port, i.e., the second optic fiber 14 of the first collimator 12, through the backward path 200, and leave from the third port, i.e., the third optic fiber 20 of the second collimator 16.

It should also be noted that the birefringent wedges 32, 34, 38 and 40 are birefringent crystals. Thus, the angle of the birefringent wedge, the relative positioning of the wedges with regard to the axis of the circulator 10, and the dimensions of the birefringent wedge are also key factors of the circulator 10 to have the light beam trace along the predetermined path which defines the correct deflection, splitting (branching), reflection, and rejoining (combination) thereof. Additionally, the relative positions among the first and second isolator sections 24, 26, and the first deflecting device 28 and the second deflecting device 30, should be all precisely arranged so as to assure the split or rejoined light beams can be correctly transmitted to the next media through a correct path.

Therefore, the two pairs of the birefringent wedges 32/34 and 38/40, are configured the same in both dimension and shape, but characterized to have respective specific optic axes with regard to their own geometrical shape, thus identifying and differentiating E-ray and O-ray to control the paths thereof. It is also noted that as mentioned before, the first birefringent wedge 32 and the second birefringent wedge 34 are totally same with each other including their dimensions, material characters and the directions of their optic axes, but only reversely positioned with each other for forming thereof the different directions of the optic axes with regard to axis X, respectively, as shown in FIGS. 1(A)–1(C). Similarly, the third birefringent wedge 38 and the fourth birefringent wedge 40 are provided totally same with each other including their dimensions, material characters and the directions of their optic axes, but only reversely positioned with each other for forming thereof the different directions of the optic axes with regard to axis X, respectively, as shown in FIGS. 1(A)–1(C). While the direction of the optic axis of birefringent wedge 32(34) with regard to its own geometrical shape has a forty-five degrees offset with regard to the direction of the optic axis of the birefringent wedge 38(40) with regard to its own geometrical shape, as compared from FIGS. 3(A) and 3(C) or from FIGS. 3(B) and 3(D).

One important feature of the invention is to provide a circulator 10 by using two isolator sections 24, 26 wherein the first isolator section 24 and the second isolator section 26 are designedly complementary with each other from a viewpoint of light transmission, so that the second isolator core 26 may converge the two split backward rays 500, 600, which are diverged by the first isolator core 24, back into one. Similarly, the first isolator core 24 may converge the two split forward light rays 300, 400, which are lesser diverged by the second isolator core 26, back into one. The invention is the first one using a pair of wedge type complementary isolator sections for performing a circulator.

It is also noted that the invention uses the same non-reciprocal section 22 to transmit the forward and backward light beams, thus reducing the material cost. Additionally, the non-reciprocal section 22 has a compensatory symmetry arrangement, thus minimizing the polarization-mode-dispersion thereof. Moreover, the dual-fiber collimator 16 is employed in the invention to achieve a compact miniature structure.

While the present invention has been described with reference to specific embodiments, the description is illustrative of the invention and is not to be construed as limiting the invention. Various modifications to the present invention can be made to the preferred embodiments by those skilled in the art without departing from the true spirit and scope of the invention as defined by the appended claims.

Therefore, person of ordinary skill in this field are to understand that all such equivalent structures are to be included within the scope of the following claims.

I claim:

1. A circulator comprising:
   a first collimator, a second collimator, and first, second and third ports, said first collimator defining the second port, said second collimator defining the first port and the third port, and a non-reciprocal section positioned between said first collimator and said second collimator;
   said non-reciprocal section including:
   a first isolator section and a complementary second isolator section commonly defining a forward path and a backward path thereof, whereby a forward light beam may enter the circulator from the first port of the second collimator, through the forward path and leave from the second port; in opposite, a backward light beam may enter the circulator from the second port, through the backward path and leave from the third port, wherein the forward path and the backward path are different from each other; wherein a non-birefringent deflecting device is provided between the first isolator section and the second isolator section.

2. The circulator as defined in claim 1, wherein another deflecting device is provided between the second isolator section and the second collimator.

3. The circulator as defined in claim 2, wherein said another deflecting device is a rectangular prism.

4. The circulator as defined in claim 1, wherein said first isolator section includes a first birefringent wedge and a second birefringent wedge sandwiching a first Faraday rotator therebetween.

5. The circulator as defined in claim 4, wherein said first birefringent wedge and the second birefringent wedge are totally same but conversely positioned with each other.

6. The circulator as defined in claim 1, wherein said second isolator section includes a birefringent wedge and another birefringent wedge sandwiching a Faraday rotator therebetween.

7. The circulator as defined in claim 6, wherein said birefringent wedge and said another birefringent wedge are totally same but conversely positioned with each other.

8. The circulator as defined in claim 1, wherein said deflecting device is a dovetail prism.

9. The circulator as defined in claim 1, wherein said first isolator section includes a first birefringent wedge and a second birefringent wedge and said second isolator section includes a third birefringent wedge and a fourth birefringent wedge, and wherein all of said birefringent wedges have the same geometrical shape and a direction of an optic axis of the second birefringent wedge with regard to the geometrical shape thereof is perpendicular to that of another optic axis of the third birefringent wedge with regard to the geometrical shape thereof.

10. A non-reciprocal section for use with a circulator, comprising:
   a first isolator section and a second isolator section; and
   a deflecting device being positioned between the first isolator section and the second isolator section; wherein said deflecting device is a dovetail prism so that two backward light beams which are divergently outward deflected, may be convergently inward deflected toward each(other after passing the deflecting device.

11. The non-reciprocal section as claimed in claim 10, wherein a second deflecting device is positioned beside the second isolator section opposite to the first deflecting device, and is a rectangular prism for reflecting the backward light beam back to a collimator.

12. A method for providing two different paths transmitting a backward light beam and a forward light beam, respectively, comprising steps of:
   providing first mechanism including means for significantly splitting a backward light beam into two backward rays;
   providing second means for rejoining said two backward rays into one;
   providing third mechanism including means for reflecting the split backward rays before said backward rays enter the second mechanism; and
   defining a forward path and a backward path in said first mechanism, said second mechanism and said third mechanism for allowing the forward light beam and the backward light beam to travel therealong; wherein the forward path and the backward path are different from each other and the forward path is deflected less than the backward path with regard to an imaginary center line along an axial direction of a combination of said first mechanism and second mechanism; wherein
   said third mechanism is positioned between said first mechanism and said second mechanism for reflecting two rays from an outward divergent manner to an inward convergent manner and toward each other.

13. The method as defined in claim 12, wherein said first mechanism, second mechanism and third mechanism are aligned with one another along axis Z, and the backward light beam is significantly separably outward or jointly inward deflected with regard to axis Y.

14. The method as defined in claim 13, wherein the backward light beam is further deflected with regard to axis X.

15. The method as defined in claim 12, wherein said first mechanism, second mechanism and third mechanism are aligned with one another along axis Z, and said forward light beam is little deflected with regard to axis x but not with regard to axis Y.

16. A method for providing two different paths transmitting a backward light beam and a forward light beam, respectively, comprising steps of:
   providing a first birefringent wedge and a second birefringent wedge to have an E-ray and an O-ray of a backward light beam in the first birefringent wedge respectively converted to be the O-ray and an E-ray in the second birefringent wedge, so as to significantly split the backward light beam into two backward rays; and
   providing a third birefringent wedge and a fourth birefringent wedge to have the O-ray and the E-ray of the backward light beam in the third birefringent wedge respectively converted to be the E-ray and the O-ray in the fourth birefringent wedge so as to significantly rejoin said two backward rays into one.

17. The method as defined in claim 16, wherein said method further comprises a step of providing a first Faraday rotator between the first birefringent wedge and the second birefringent wedge, and a second Faraday rotator between the third birefringent wedge and the fourth birefringent wedge.

18. The method as defined in claim 16, wherein an O-ray and an E-ray of a forward light beam in the fourth birefringent wedge are still the same in the third birefringent wedge, and an O-ray and an E-ray of the forward light beam in the second birefringent wedge are still the same in the first birefringent wedge, while the O-ray and the E-ray in the third birefringent wedge are converted to the E-ray and the O-ray in the second birefringent wedge.

19. A circulator comprising:
   at least three ports including first, second and third ports wherein light may enter from the first port and leave from the second port, or may enter from the second port and leave from the third port;
   a first birefringent wedge defining a first optic axis;
   a second birefringent wedge defining a second optic axis opposite to said first optic axis with regard to one selected axis;
   a third birefringent wedge defining a third optic axis perpendicular to said second optic axis; and
   a fourth birefringent wedge defining a fourth optic axis opposite to said third optic axis with regard to the same selected axis.

20. The circulator as claimed in claim 19, wherein a first Faraday rotator and a second Faraday rotator are respectively provided between said first birefringent wedge and said second birefringent wedge, and between the third birefringent wedge and the fourth birefringent wedge for rotating direction of polarization of a transmitted light beam with respective predetermined angles.

21. The circulator as defined in claim 20, wherein said selected axis is axis X.

22. The circulator as defined in claim 21, wherein the first optic axis is at 67.5° with regard to axis X, the second optic axis is at −67.5° with regard to axis X, the third optic axis is at 22.5° with regard to axis X, and the fourth optic axis is at −22.5° with regard to axis X.

23. The circulator as defined*in claim 20, wherein said predetermined angles are −45° and 45°, respectively.

24. A circulator comprising:
   at least three ports including first, second and third ports wherein light may enter from the first port and leave from the second port, or may enter from the second port and leave from the third port;
   a first birefringent wedge and a reversely positioned second birefringent wedge having a same configuration as the first birefringent wedge and cooperating with the first birefringent wedge sandwiching a first rotator therebetween; and
   a third birefringent wedge and a reversely positioned fourth birefringent wedge having the same configuration as the third birefringent wedge and cooperating with the third birefringent wedge sandwiching a rotator therebetween; wherein
   the second birefringent wedge and the third birefringent wedge are reversely positioned with each other.

25. The circulator as defined in claim 24, wherein a deflecting device is positioned between the second birefringent wedge and the third birefringent wedge.

* * * * *